L. H. JACOBS.
FISH HOOK.
APPLICATION FILED DEC. 2, 1916.
1,217,769.
Patented Feb. 27, 1917.
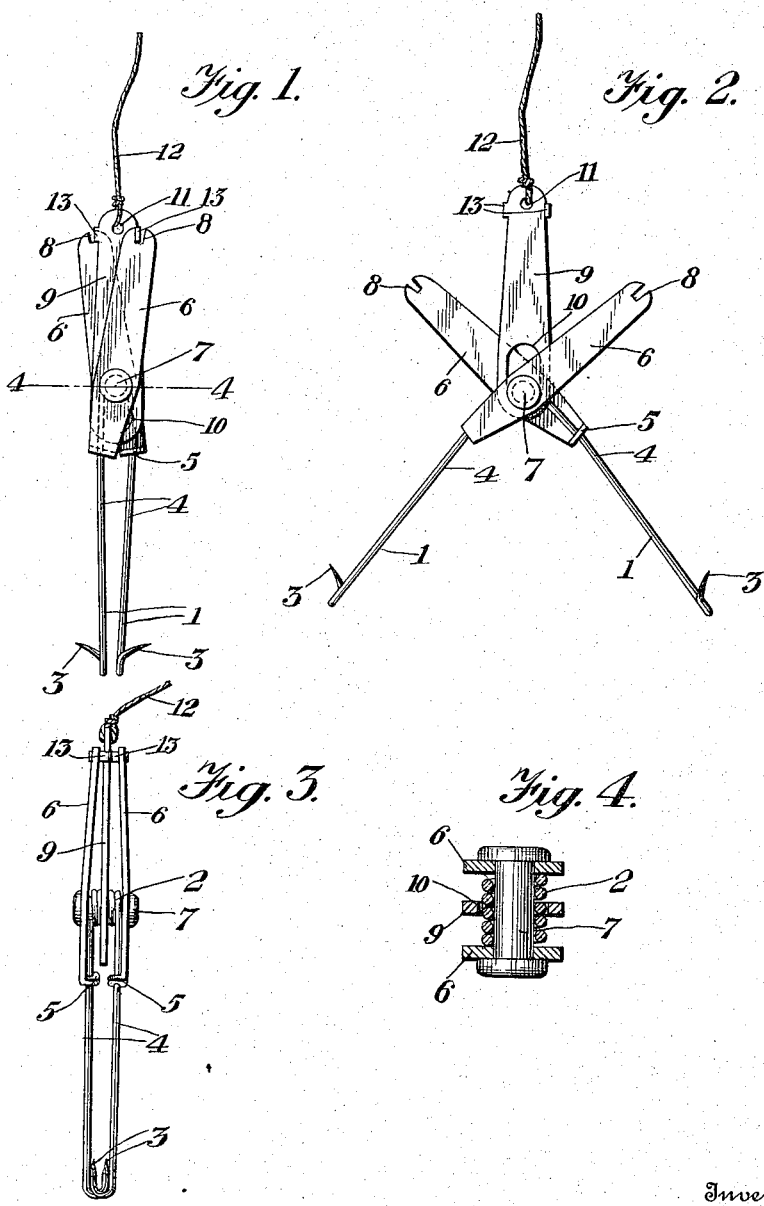
Witness
R. E. Rousseau.
J. W. Garner
Inventor
L. H. Jacobs.
By Victor J. Evans
Attorney

UNITED STATES PATENT OFFICE.

LEARCUS H. JACOBS, OF BUNN, ARKANSAS.

FISH-HOOK.

1,217,769. Specification of Letters Patent. Patented Feb. 27, 1917.

Application filed December 2, 1916. Serial No. 134,655.

*To all whom it may concern:*

Be it known that I, LEARCUS H. JACOBS, a citizen of the United States, residing at Bunn, in the county of Dallas and State of Arkansas, have invented new and useful Improvements in Fish-Hooks, of which the following is a specification.

This invention relates to improvements in fish hooks and especially with reference to the provision of a pair of hook members pivotally mounted for movement toward and from each other, a spring for moving the hook members apart, arms to enable the hook members to be readily set in closed position and a locking and attaching member for attaching the hook to a line, for locking the hook members in closed position and to release the hook members when the bait is taken by fish and thereby causing the hook members to move outwardly in opposite directions in the mouth of a fish and thereby securely hook the fish and insure his being landed, a further object of the invention being to provide an improved hook of this character which is simple in construction and which may be used either with a handline, for casting, or for trolling.

The invention consists in the construction, combination and arrangement of devices hereinafter described and claimed.

In the accompanying drawings:

Figure 1 is an elevation of a fish hook constructed and arranged in accordance with my invention and showing the same set.

Fig. 2 is a similar view showing the hook members released.

Figs. 3 and 4 are sectional views of the same.

In the embodiment of the invention here shown a pair of hook members 1 are provided which are made from a single piece of spring wire and are connected together by integral spring coils 2 which serve to spring the hook members outwardly to engage their oppositely directed outturned points 3 in opposite sides of the mouth or throat of a fish which takes the hook.

The arms 4 of the hook members pass through openings in inturned lugs 5 at the lower ends of a pair of lever members 6 which in practice are preferably made of polished sheet metal which will be clearly visible in the water, and attractive to the fish. The said lever members are mounted on a pivot 7 which passes through the spring coils 2 so that the said lever members are pivotally connected together and are arranged for movement with the hook members. Each lever member has a notch 8 at its upper end.

I also provide an attaching and locking member 9 which is also preferably made of polished sheet metal and which is arranged between the lever members and has a slot 10 to clear the spring coils 2. The member 9 has an opening 11 at its upper end for the attachment of a line 12 and is also provided, near its upper end, with oppositely extending locking lugs 13 which may be engaged with the notches 8 to lock the member 6 and hence also the hook members in closed position.

The hook members, when the device is in use, are baited and when a fish takes the hook, the tug upon the line causes the member 9 to be drawn upwardly a slight distance thus disengaging the lugs 13 thereof from the notches 8 and hence releasing the lever members 6, whereupon the spring coils 2 cause the hook members to instantly spread the spring apart, so that the points 3 are engaged in opposite sides of the mouth and throat of the fish and the fish is securely caught and prevented from getting away.

The members 6 may be of any suitable construction to render the device attractive to fish and enable the device to be used, if desired, without a bait. The hook is adapted for use on a hand line, for casting or for trolling, as may be desired.

The pivoted member 7 is in practice preferably made of lead or other suitable heavy material, or weighted, to provide a suitable sinker for the line and hook.

Having thus described the invention what is claimed is:

1. A fish hook comprising a pair of hook members mounted for movement toward and from each other and each having an upwardly extending lever arm provided with a notch in its upper end, a pivoting member on which the hook members and lever arms are mounted for angular movement, and a locking and attaching member arranged between and in sliding relation to the lever arms and having a slot through which the pivoting member extends, said locking and attaching member being provided with lugs to engage and disengage the notches of the lever arms.

2. A fish hook comprising a pair of hook members mounted for movement toward and from each other and connected together at their upper ends by a spring coil arranged to move the hook members outwardly, a pivoting member extending through said spring coil, lever arms pivotally mounted on said pivoting member, attached respectively to the hook members and each provided in its upper end with a notch, and a locking and attaching member arranged between and in sliding relation to the lever arms, said member being provided with a vertical slot through which the pivoting member extends and being provided with lugs to engage and disengage the notches of the lever arms.

In testimony whereof I affix my signature.

LEARCUS H. JACOBS.

Copies of this patent may be obtained for five cents each, by addressing the "Commissioner of Patents, Washington, D. C."